United States Patent [19]
Thomas et al.

[11] Patent Number: 5,393,098
[45] Date of Patent: Feb. 28, 1995

[54] SEAT BELT HEIGHT ADJUSTER

[75] Inventors: Rudy V. Thomas, Sterling Hts.; Robert C. Pfeiffer, Troy, both of Mich.

[73] Assignee: AlliedSignal Inc., Morristown, N.J.

[21] Appl. No.: 167,276

[22] Filed: Dec. 16, 1993

[51] Int. Cl.$^6$ ............................................ B60R 22/00
[52] U.S. Cl. .................. 280/801.2; 280/808; 297/483
[58] Field of Search ............... 280/801.20, 808, 801.1; 297/483, 486, 468; 248/297.3

[56] References Cited

U.S. PATENT DOCUMENTS

| | | | |
|---|---|---|---|
| 4,564,219 | 1/1986 | Baden et al. | 280/801 A |
| 4,577,888 | 3/1986 | Takada | 280/801 A |
| 5,050,907 | 9/1991 | Boumarafi et al. | 280/801 A |
| 5,149,136 | 9/1992 | Maekawa et al. | 280/801 A |

FOREIGN PATENT DOCUMENTS

| | | | |
|---|---|---|---|
| 0057048 | 4/1984 | Japan | 280/801 A |
| 0230705 | 10/1985 | Japan | 280/801 A |
| 2241635 | 9/1991 | United Kingdom | 280/801 A |

*Primary Examiner*—Kenneth R. Rice
*Assistant Examiner*—Christopher P. Ellis
*Attorney, Agent, or Firm*—Markell Seitzman

[57] ABSTRACT

A height adjuster (10) useful to adjust the height of a safety belt webbing, comprising: a frame (12) having a plurality of spaced locking formations (18); a carrier (16) movably mounted upon the frame comprising; a handle assembly (40) for locking the carrier into a designated one of the locking formations (18) comprising: a locking pin (50) movable into and out from the designated locking formation and biased by a first spring (134) toward the locking formations: and activation assembly (60,70,90), comprising variable height spring (90) for initiating retraction of the pin from the designated locking formation in response to a squeezing or clamping action, the carrier being movable along the frame with the locking pin (50) disengaged from any locking formation.

13 Claims, 4 Drawing Sheets

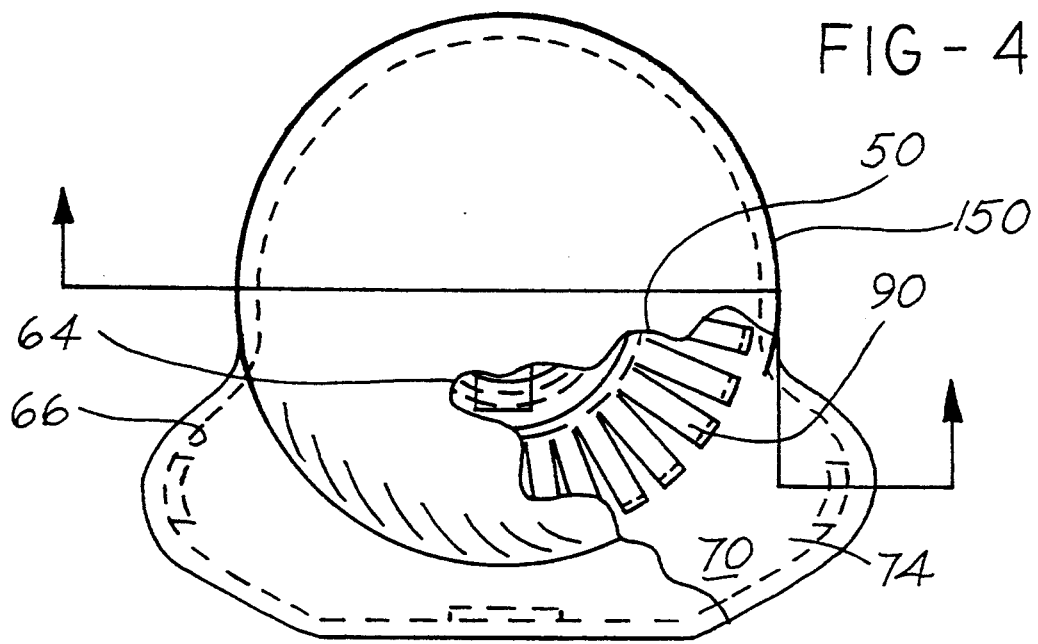
FIG-4
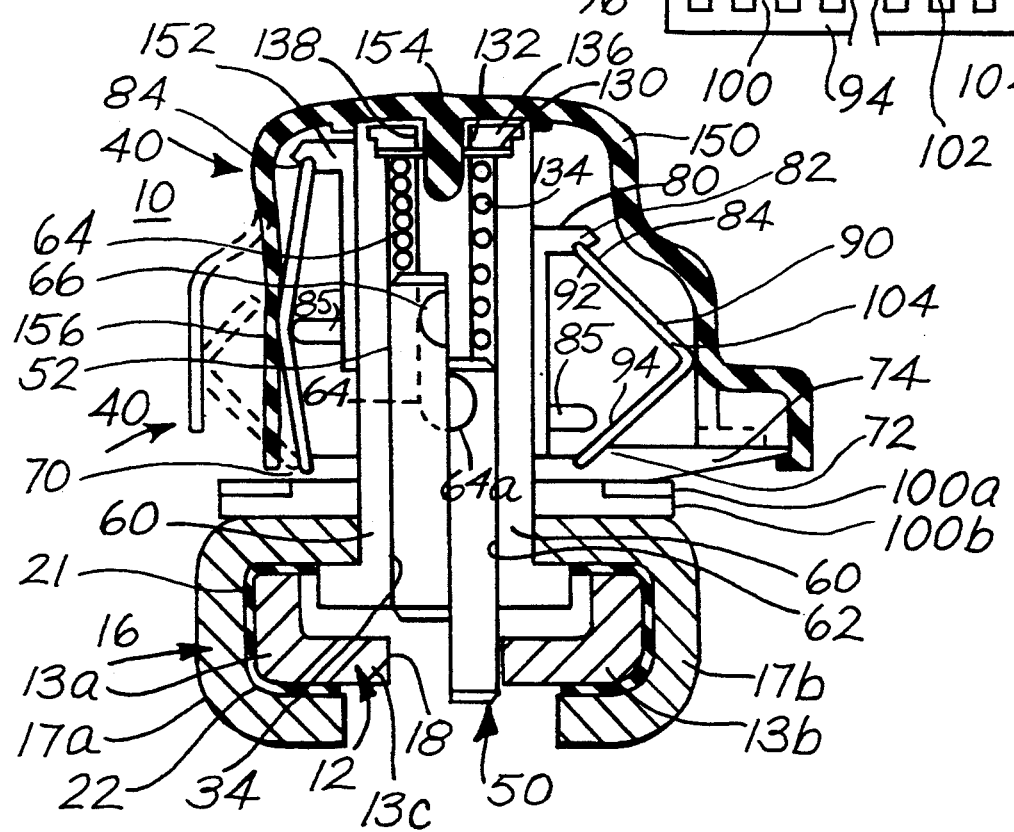
FIG-6
FIG-1

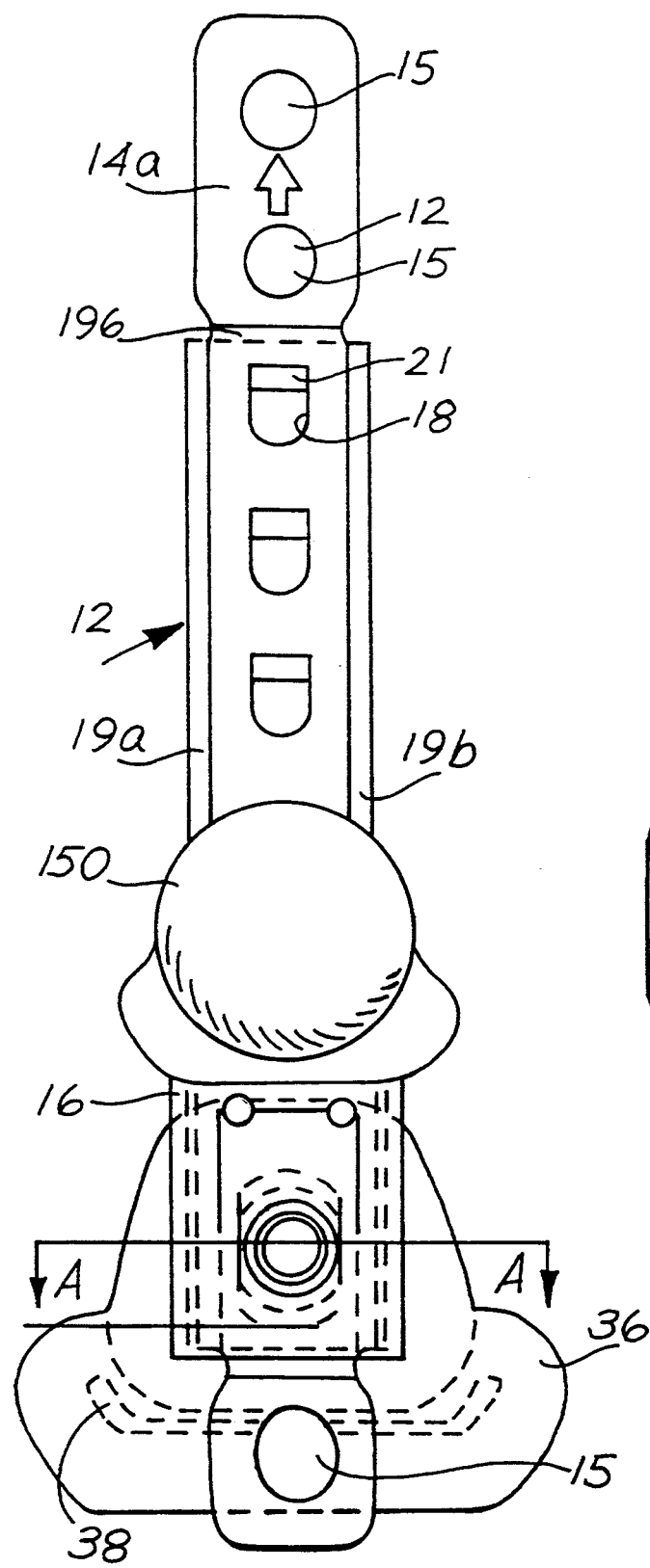
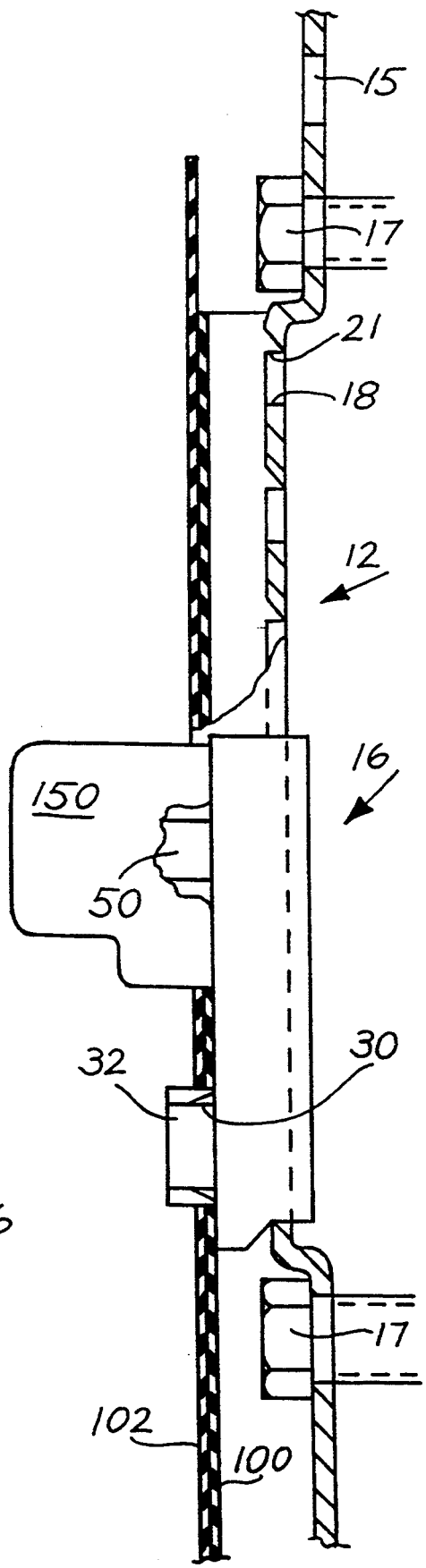
FIG-2
FIG-3

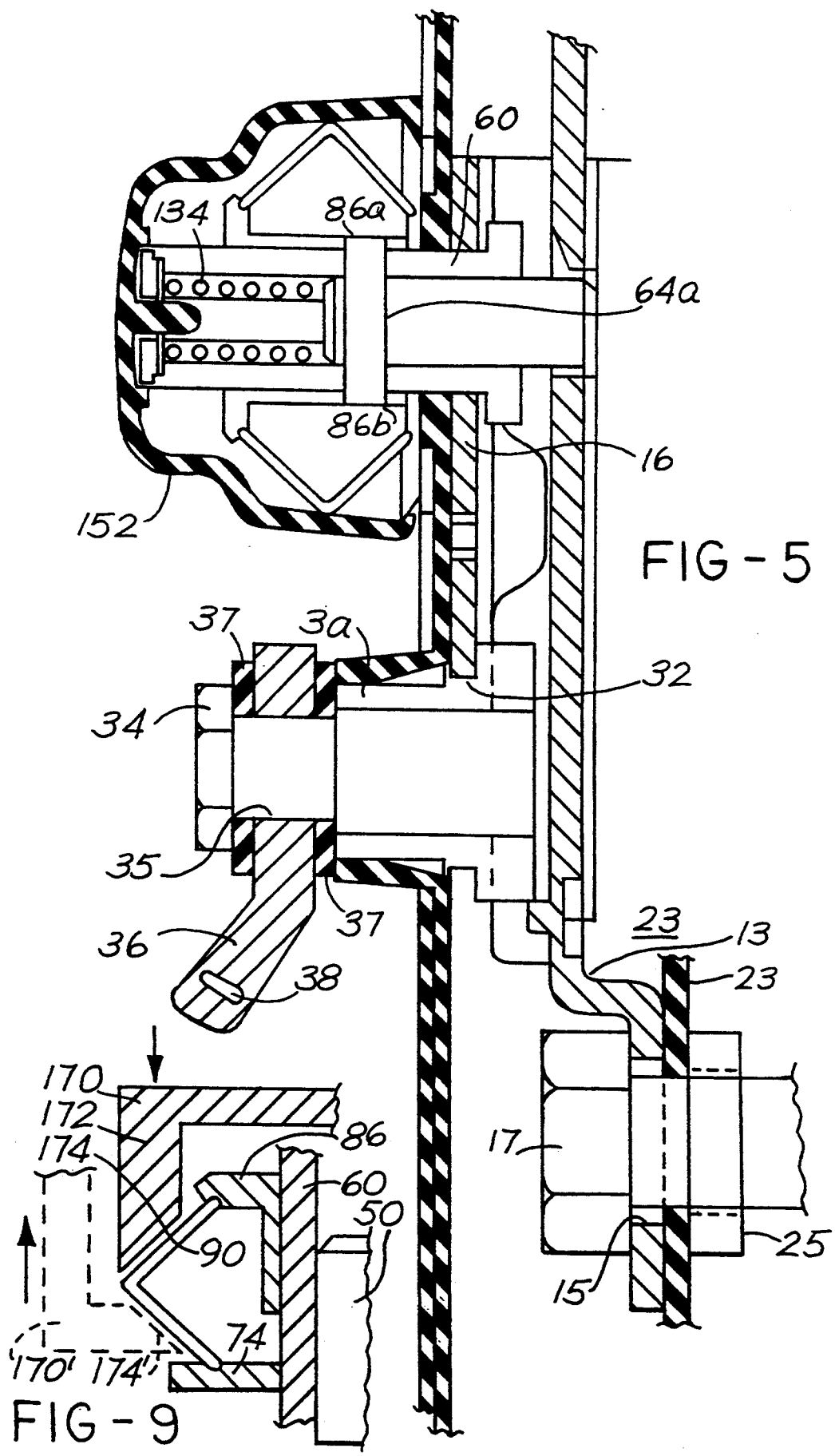

SEAT BELT HEIGHT ADJUSTER

BACKGROUND AND SUMMARY OF INVENTION

The present invention generally relates to a seat belt height adjuster.

Many vehicles use seat belt height adjusters which permit the occupant to vary the location of an associated D-ring so that a shoulder belt portion of a safety belt crosses the occupants upper torso, shoulder or neck at a comfortable location. U.S. Pat. No. 4,571,001, Hakannson, is illustrative of a typical prior art height adjuster. Upon pulling a handle outwardly an associated pin is moved from a locking formation or opening in a frame. A slide or carrier is moved up or down within a frame to vary the D-ring's position. Thereafter the locking pin is latched within another one of the locking formations under control of the occupant. In the above-referenced patent, the unlocking force is applied along a single predetermined direction in order to initiate removal of the pin from the locking formation.

It is an object of the present invention to provide an improved height adjuster with a multi-directional unlocking means. Accordingly, the invention comprises: a frame having a plurality of spaced locking formations, a carrier movably mounted upon the frame. The carrier has a handle assembly for locking the carrier into one of the locking formations comprising a locking pin movable into and of the designated locking formation and biased by a first spring toward the locking formations, and a variable height spring means for initiating retraction of the pin from the designated locking formation in response to an inwardly directed force on the spring means. The carrier is movable along the frame with the locking pin disengaged from any locking formation. More specifically, the present invention includes a cylindrical first sleeve having a central bore therethrough, a bearing plate, located about the first sleeve, the bearing plate includes first spring retaining means for receiving a first side of the spring means, a second sleeve is slidably received about the first sleeve connected and movable with the locking pin. The second sleeve includes second spring retaining means for receiving an opposing side of the spring means.

Many other objects and purposes of the invention will be clear from the following detailed description of the drawings.

BRIEF DESCRIPTION OF THE DRAWINGS

In the drawings:

FIG. 1 illustrates a split cross-sectional view of the a first embodiment of the invention.

FIG. 2 shows a plan front view of a rail or track with a carrier fitted thereon.

FIG. 3 is a side plan view of the track and carrier.

FIG. 4 is a top plan view of a handle assembly.

FIG. 5 shows an enlarged view of a part of the track and carrier.

FIG. 6 illustrates an isolated view of a spring.

FIG. 9 shows a further embodiment of the invention.

DETAILED DESCRIPTION OF THE DRAWINGS

Figure 8:
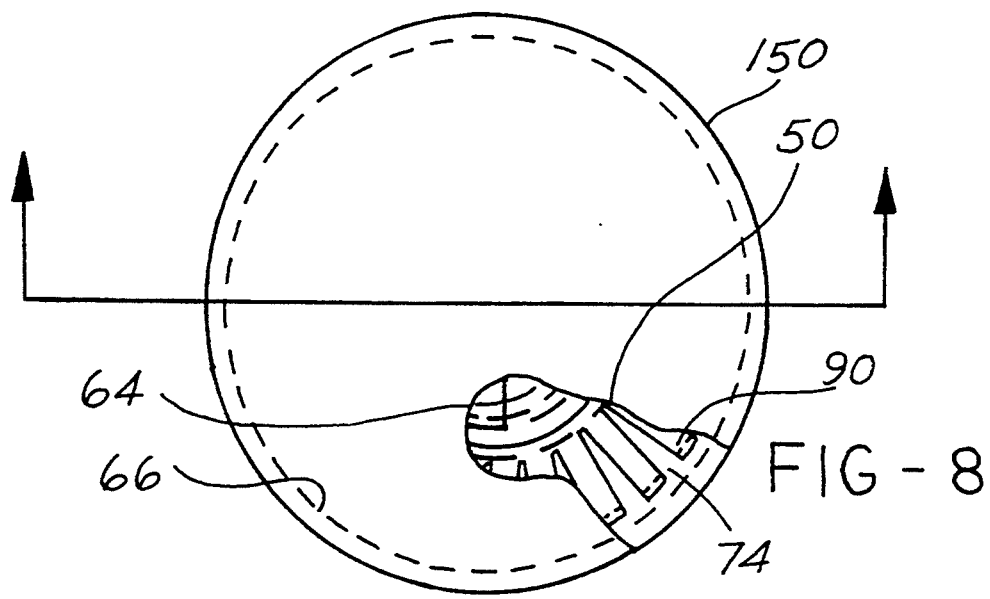
FIGS. 7 and 8 show an alternate embodiment of the invention.

With reference to the drawings there is shown a height adjuster 10 comprising of frame rail or track 12 (see FIGS. 1, 2 and 3) typically made of steel, carrier 16 and handle assembly 40. The frame includes side walls 13a and 13b and bottom 13c. The bottom includes a plurality of spaced slots 18 having chamfered entry portions 21. Two flat flanges 14a and 14b extend outwardly from the bottom 13c. Each flange 12 is provided with a mounting openings 15 to received a fastener 17 such as a bolt to enable the track to be mounted to a part 23 of the vehicle such as a B-pillar in a known manner. The fastener 17 may be received in a threaded nut 25 in the B-pillar (see FIG. 5).

Slidably received upon the frame 12 is the carrier generally shown as 16 which comprises a pair of bent over side walls 17a and 17b to envelope the sides 13a,b of the frame 12. Ends of the frame are bent at 19a and 19b to provide an off-set relative to a mounting surface 23 such as the B-pillar of the vehicle. Positioned on the interior 22 of the side walls 17a,b is a plastic spacer or bushing sleeve 21 which provides a low friction surface upon which the carrier may slide relative to the frame 12. The spacer or bushing sleeve 21 also reduces noise by providing a plastic to metal interface. Situated at the lower part of the carrier is a threaded stud 30 secured within an opening 32 (see FIG. 5) in the carrier 16. A partially threaded fastener 34 mounts a D-ring 36 to the carrier 16 as shown in FIG. 5. The D-ring 36 is free to rotate about a smooth part 35 of the fastener 34. Washers or spacers 37 may also be provided to facilitate the rotation of the D-ring. The shoulder belt webbing is laced through a slit 38 (see FIG. 2) in the D-ring in a known manner.

Located on the carrier 16, above the D-ring 36, is a handle assembly generally shown as 40. The handle assembly 40 comprises a first cylindrical sleeve 60 secured to the carrier 16. The sleeve 60 includes a bore 62 in which a pin 50 is slidably received. Located near the top of the pin is a bore 52. Opposing walls of the sleeve 60 include a U-shaped slot or groove 64. Positioned about the sleeve 60 is a bearing plate 70 which is generally circular at its top. The lower part of the bearing plate 70 defines an oblong shaped cover retaining flange 74 as can be seen in FIG. 4. The bearing plate 70 includes a first spring retaining means 72 which may comprise a circular groove. Only part of the cover retaining flange 74 can be seen in FIG. 1. The general shape of the flange can be seen in the top view of FIG. 4. A second sleeve 80 is slidably mounted about the first sleeve 60. The second sleeve includes an outwardly extending shoulder 82 on which is formed a second spring retaining means 84 which may be another groove. A cylindrical spring 90 is received between the first and second spring retaining means 72 and 84, such that a first side 92 and a second side 94 of the spring 90 are received and secured therein. The sleeve 80, in opposing walls thereof includes openings 86a and 86b (see FIG. 5). A transverse pin 66 connects the locking pin 50 and the second sleeve 80 together. The transverse pin 66 is slidingly received in the slots 64 of the sleeve 60. The transverse pin 66 is press fit through the bore 52 of the locking pin 50 and extends through the opposed openings 86a,b in the second sleeve 80. The downward movement of the locking pin 50 is halted when the transverse pin 66 contacts the lower end 64a of groove 64.

Slidingly covering the track 12 and carried by the carrier 16 is an inner cover 100 and an outer cover 102. The length of the covers is somewhat longer than the length of the track 12. Each of these covers 100 and 102 may be made from semi-rigid plastic. The covers slide within an opening in the B-pillar, in a known manner (not shown). The purpose of the covers is primarily to hide the portions of the track from view.

Reference is briefly made to FIG. 6 which illustrates an isolated view of spring 90 before it is formed into its cylindrical shape. The spring 90 may be formed from a thin rectangular plate having ends 96 and 98 and sides 92 and 94. A plurality of ribs 100 extend between the sides 92 and 96. The ribs 100 may be formed by removing sections 102 of spring material. The spring 90 is bent generally about its middle 104 to prestress it so that it remains slightly bent defining a preferred bending region. The flat, bent plate is formed into a cylinder with its center region bent or bowed outwardly as illustrated on the right hand side of FIG. 1. Alternately, the spring 90 may be molded and of a resiliant plastic. The spring 90 would be molded having a bent or curved, relaxed configuration as shown in FIG. 1. If the spring sides 92 and 94 are physically secured to the retaining flange 74 and second sleeve 80 it may be possible to eliminate the spring 134, since as the spring 90 collapases to its rest position it will bias, or pull, the second sleeve downwardly pushing the pin 50 toward or into one of the openings 18. If a plastic spring 90 is used the second sleeve 80 and retaining flange 74 would preferrably be plastic parts as well to enable the physical connection, such as welding, therebetween.

Returning to FIG. 1, the top of the bore 62 is enclosed by a washer 130 having a central opening 132. Positioned between the washer and the top of the pin 50 is another spring 134 which biases second sleeve 80 downwardly and the pin 50 toward a slot 18. The spring 134 is retained within bore 62 by a lock washer 136, press fit therein, having an opening 138 therein. As can be appreciated, when the spring 90 is in its rest or relaxed position, the spacing between the sides reduces, as can be seen in FIG. 1.

The handle assembly 40 further includes a cover 150 formed of a resilient, flexible material typically plastic. As can be seen, the cover 150 protects the various parts of the assembly 40. The cover 150 includes a top portion 152 having an inwardly directed boss 154 that is frictionally received and secured within opening 132 of washer 130. The flexible walls 156 of the cover 150 extend downwardly, covering the ribs 100 of the spring 90. The lower end of the walls 156 are snap fit about the bearing plate 70, including the cover flange 74 portion to assist in keeping the cover 150 in place.

Reference is again made to FIG. 1, which illustrates the right hand portion of the pin 50 inserted within a designated one of the slots 18. As mentioned, the pin 50 is biased downwardly by spring 134. Recalling that the second sleeve 80 is physically linked to the pin 50 the two will move together. The downward bias on the second sleeve urges spring 90 outwardly which in turn forces the flexible walls 156 of the cover 150 outwardly as shown on the right hand portion of FIG. 1.

When the vehicle occupant desires to reposition the height of the D-ring, the occupant grasps the flexible walls of the cover 150, squeezing same inwardly. This squeezing or clamping action applied to the cover walls 156 urges the center bent portion 104 of the spring 90 inwardly causing the sides 92 and 92 of spring 90 to straighten and move farther apart as the spring is compressed achieving the configuration generally shown in the left hand portion of the FIG. 1. The inward motion of the spring 90 ribs is stopped by the flex stop member or boss 85 formed about the second sleeve 80. As the center portion 104 of the spring 90 is moved inwardly, the top end 92 of the spring moves upwardly carrying with it the second sleeve 80 and pin 50. As can be appreciated, the locking pin 50 is lifted up from the designated slot 18. With pin 50 out of the slot, the handle assembly 40 including the carrier 16 may be slid vertically up or down over another slot 18. Once the occupant releases flexible cover 150, spring 90 relaxes to its unstress condition thereby lowering the pin 50. If the pin 50 does not engage a slot 18, the carrier 16 can be repositioned slightly until a positive locking of the pin 50 within a desired slot 18 occurs. The chamfered edges of the openings 18 facilitate pin 50 entry into the slot 18 permitting the pin 50 to slide into the slot.

Figure 7:
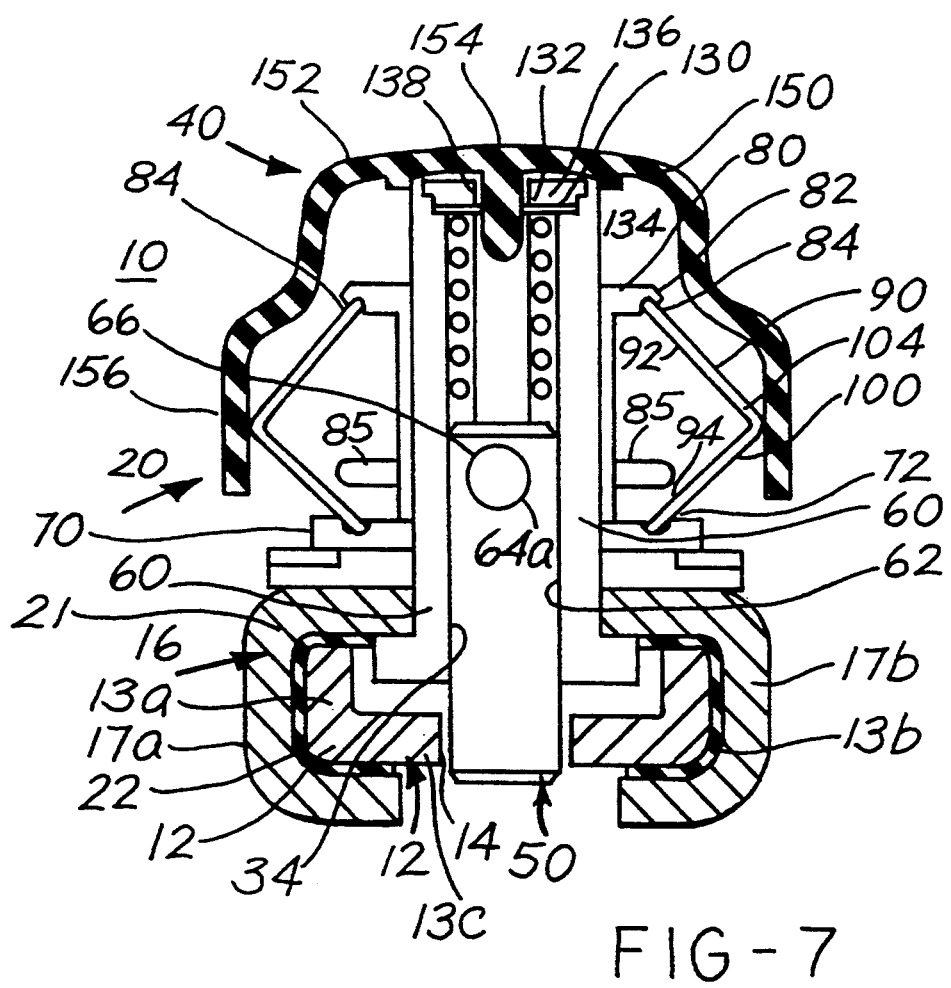

FIGS. 7 and 8 illustrate an alternate embodiment of the invention which is identical to that shown above with the exception tha the bearing plate 70 is circular. As can be seen the cover 150', resembles a circular cylinder and is closely spaced relative to the sides of the spring 90. As can be appreciated because of the configuration of the cover 150' the occupant is able to clasp the cover and provide the clamping force at virtually any two opposite locations about the periphery of the cover.

FIG. 9 shows another embodiment of the invention in which a button, or handle 170 is provided. The handle 170 includes a cylindrical wall 172 having a ramped surface 174. Upon depressing the handle 170 the ramped surface 174 engages the sloped ribs of the relaxed spring 90 generating a compressive force on the spring 90 causing it to collapse inwardly. As the center of spring 90 collapses, its ends separate, pusing the second sleeve up and withdrawing pin 50 from an opening 18 and permitting the carrier 16 to be moved to another location on the frame. The phantom lines shows a handle 170' having a ramped surface 174'. When the handle 174 is pulled or moved upwardly it similarly collapses the center of the spring 90, withdrawing the pin 50.

Many changes and modifications in the above described embodiment of the invention can, of course, be carried out without departing from the scope thereof. Accordingly, that scope is intended to be limited only by the scope of the appended claims.

We claim:

1. A device (10) useful to adjust the height of a safety belt webbing, comprising:
   a frame (12) having a plurality of spaced locking formations (18);
   a carrier (16) movably mounted upon the frame comprising;
   handle assembly means (40) for moving the carrier and for locking the carrier into a designated one of the locking formations (18) comprising:
   a locking pin (50) movable into and out from the designated locking formation; and
   first means (60,70,90), comprising a center collapsible, variable height cup shaped means (90) with an associated periphery thereof for initiating retraction of the pin from the designated locking formation in response to a squeezing or clamping action, generally oppositely received at arbitrary, locations about the periphery of the spring means, the carrier being movable along the frame with the locking pin (50) disengaged from any locking formation.

2. A device (10) useful to adjust the height of a safety belt webbing, comprising:

a frame (12) having a plurality of spaced locking formations (18);

a carrier (16) movably mounted upon the frame comprising:

handle assembly means (40) for moving the carrier and for locking the carrier into a designated one of the locking formations (18) comprising:

a locking pin (50) movable into and out from the designated locking formation; and first means (60,70,90), comprising center collapsible, variable height spring means (90) for initiating retraction of the pin from the designated locking formation in response to a squeezing or clamping action, the carrier being movable along the frame with the locking pin (50) disengaged from any locking formation wherein the first means comprises:

a cylindrical first sleeve (60) having a central bore (62) therethrough, a bearing plate (70), located about the first sleeve, the bearing plate including first spring retaining means (72) for receiving a first side (94) of the spring means (90), a second sleeve (80) slidably received about the first sleeve (60) connected and movable with the locking pin (50) and including second spring retaining means (84) for receiving an opposing side (92) of the spring means (90).

3. The device as defined in claim 2 wherein the spring means (90) is generally of a cylindrical shape and includes a flexible wall member (100) bowed outwardly under a compressive load, the wall member (100) capable of being moved inwardly in response to the squeezing action, such inward movement causing the spring sides (92,94) to move apart lifting the second sleeve (80) thereby carrying the locking pin (50) out from the locking formation.

4. The device (10) as defined in claim 3 including a spring retainer means (130) for retaining the first spring (134) within the bore (62) of the first sleeve (60).

5. The device (10) as defined in claim 3 wherein the first means (60, 70, 90) includes a flexible cover (150) covering the spring means (90), and the first and second sleeves.

6. The device as defined in claim 4 wherein the spring retainer means (130) includes an opening (132) and wherein flexible cover (150) includes a boss (154) fictionally engaging the opening (130) for securing the cover (150) thereto.

7. The device (10) as defined in claim 2 wherein the second sleeve (80) includes at least one opening (86) in a wall portion thereof (4) and wherein the locking pin (50) is connected to the second sleeve (40) by a transverse pin (66) extending through the locking pin (50) and opening (86).

8. The device (10) as defined in claim 7 wherein the first sleeve (60) includes a slot (64) in opposite portions thereof, wherein the transverse pin (66) radially extends through and is movable within the slot (66).

9. The device as defined in claim 2 wherein the second sleeve (80) includes a stop (85) for limiting inward motion of the spring means (90).

10. The device as defined in claim 1 wherein the handle means includes a first surface for engaging the center of the spring means providing the clamping force necessary to collapse the spring means when the handle means is moved in one of an inward and an outward direction.

11. The device as defined in claim 10 wherein the first surface is ramped.

12. The device as defined in claim 2 wherein the handle means includes a first surface for engaging the center of the spring means providing the clamping force necessary to collapse the spring means when the handle means is moved in one of an inward and an outward direction.

13. The device as defined in claim 12 wherein the first surface is ramped.

* * * * *